United States Patent [19]

Paluszek et al.

[11] Patent Number: 5,130,931
[45] Date of Patent: Jul. 14, 1992

[54] SPACECRAFT ATTITUDE AND VELOCITY CONTROL SYSTEM

[75] Inventors: Michael A. Paluszek, Lawrenceville; George E. Piper, Jr., Plainsboro, both of N.J.

[73] Assignee: General Electric Company, East Windsor, N.J.

[21] Appl. No.: 552,638

[22] Filed: Jul. 13, 1990

[51] Int. Cl.[5] .................................................. B64G 1/26
[52] U.S. Cl. ...................................... 364/459; 244/164; 244/171
[58] Field of Search .......................... 364/434, 459; 244/158 R, 164, 169, 172, 171, 3.21

[56] References Cited

U.S. PATENT DOCUMENTS

| | | | |
|---|---|---|---|
| 3,866,025 | 2/1975 | Cavanagh | 364/459 |
| 4,537,375 | 8/1985 | Chan | 244/171 |
| 4,599,697 | 7/1986 | Chan et al. | 244/169 |
| 4,758,957 | 7/1988 | Hubert et al. | 364/459 |
| 4,961,551 | 10/1990 | Rosen | 244/164 |

OTHER PUBLICATIONS

"An Advanced Spacecraft Autopilot Concept", by Edward V. Bergmann et al. Journal of Guidance and Control, May–Jun. 1979, vol. 2, No. 3, Article No. 77-1071, pp. 161-168.

*Primary Examiner*—Gary Chin
*Attorney, Agent, or Firm*—William H. Meise; Stephen A. Young; Clement A. Berard

[57] ABSTRACT

A spacecraft attitude and/or velocity control system includes a controller which responds to at least attitude errors to produce command signals representing a force vector F and a torque vector T, each having three orthogonal components, which represent the forces and torques which are to be generated by the thrusters. The thrusters may include magnetic torquer or reaction wheels. Six difference equations are generated, three having the form $$\Delta_i = F_i - \sum_{j=1}^{N} b_j \alpha_j,$$

and $$\Delta_{i+3} = T_i - \sum_{j=1}^{N} a_{ij} \alpha_j,$$

where $a_j$ is the maximum torque which the $j^{th}$ thruster can produce, $b_j$ is the maximum force which the $j^{th}$ thruster can produce, and $\alpha_j$ is a variable representing the throttling factor of the $j^{th}$ thruster, which may range from zero to unity. The six equations are summed to produce a single scalar equation relating variables $\alpha_j$ to a performance index Z:

$$Z = -\sum_{i=1}^{6} |\Delta_i| - \sum_{i=1}^{N} \alpha_i$$

Those values of $\alpha$ which maximize the value of Z are determined by a method for solving linear equations, such as a linear programming method. The Simplex method may be used. The values of $\alpha_j$ are applied to control the corresponding thrusters.

6 Claims, 2 Drawing Sheets

SPACECRAFT ATTITUDE AND VELOCITY CONTROL SYSTEM

The invention described herein was made in the performance of work under NASA Contract No. NAS5-32000 and is subject to the provisions of Section 305 of the National Aeronautics and Space Act of 1958, as amended (72 Stat. 435; 42 USC 2457).

BACKGROUND OF THE INVENTION

This invention relates to the control of the thrusters of a spacecraft, and more particularly, to attitude and velocity control by the use of throttleable or pulse-modulated thrusters.

Spacecraft are widely used for communications, earth sensing and exploration, vehicle locating, and for surveillance. All of these uses require that the orientation of the spacecraft in space, and possibly its location, be accurately controlled. The spacecraft attitude may be controlled by magnetic torquers, by momentum or reaction wheels, or by the use of thrusters.

Since each spacecraft at launch has a slightly different configuration than other spacecraft, its thrusters will be placed at slightly different locations relative to the center of gravity than in other spacecraft. Also, the specific impulse characteristics of the thrusters may differ from one to the next. As a consequence, the logic for controlling the thruster system is ordinarily custom-written for each spacecraft. During the construction phase for a spacecraft, it may be found to be necessary to alter the configuration or thruster characteristics, which may require costly rewriting of software.

Control arrangements ordinarily provide torques by preselected combinations of thrusters. The selected thrusters are ordinarily located on opposite sides of the center of gravity. When in orbit, a spacecraft thruster may fail or may have a significant change in specific impulse characteristics. When a thruster fails, those combinations of torque for which the failed thruster is an element cannot be used. This may adversely affect or limit control of the spacecraft.

A spacecraft velocity and attitude control arrangement is desired in which a change in specific impulse of a particular thruster need not necessarily eliminate its use in controlling the spacecraft.

SUMMARY OF THE INVENTION

A method for controlling the attitude and velocity of a spacecraft includes the steps of generating sensed signals representative of pitch, roll and yaw. A velocity error signal may also be generated. Command signals are generated representing force and torque vectors F and T, respectively, which are to be generated by the thrusters. The force vector includes mutually orthogonal components $F_1$, $F_2$ and $F_3$, and the torque vector includes mutually orthogonal components $T_1$, $T_2$ and $T_3$. When unidimensional corrections are to be made, some or most of these components may take on zero magnitude. Six difference equations $\Delta$ of the form:

$$\Delta_i = F_1 - \sum_{j=1}^{N} b_{ij}\alpha_j$$

and

-continued
$$\Delta_{i+3} = T_i - \sum_{j=1}^{N} a_{ij}\alpha_j$$

are generated, where: a and b are the maximum torque and force, respectively, which the $j^{th}$ thruster can produce, and a is the throttle setting of the $j^{th}$ thruster, which may take on values ranging from zero to unity. The difference signals $\Delta$ are summed to form a single scalar equation relating variable a to a scalar performance index Z. The single scalar equation is solved for that value of $a_j$ which maximizes Z, and the thrusters are controlled in a manner directly related to the corresponding value of $a_j$.

DESCRIPTION OF THE DRAWING

FIG. 1b illustrates a simplified side view of the spacecraft of FIG. 1a, and FIG. 1c is a simplified side view of the spacecraft of FIG. 1a.

DESCRIPTION OF THE INVENTION

Figure 1A:
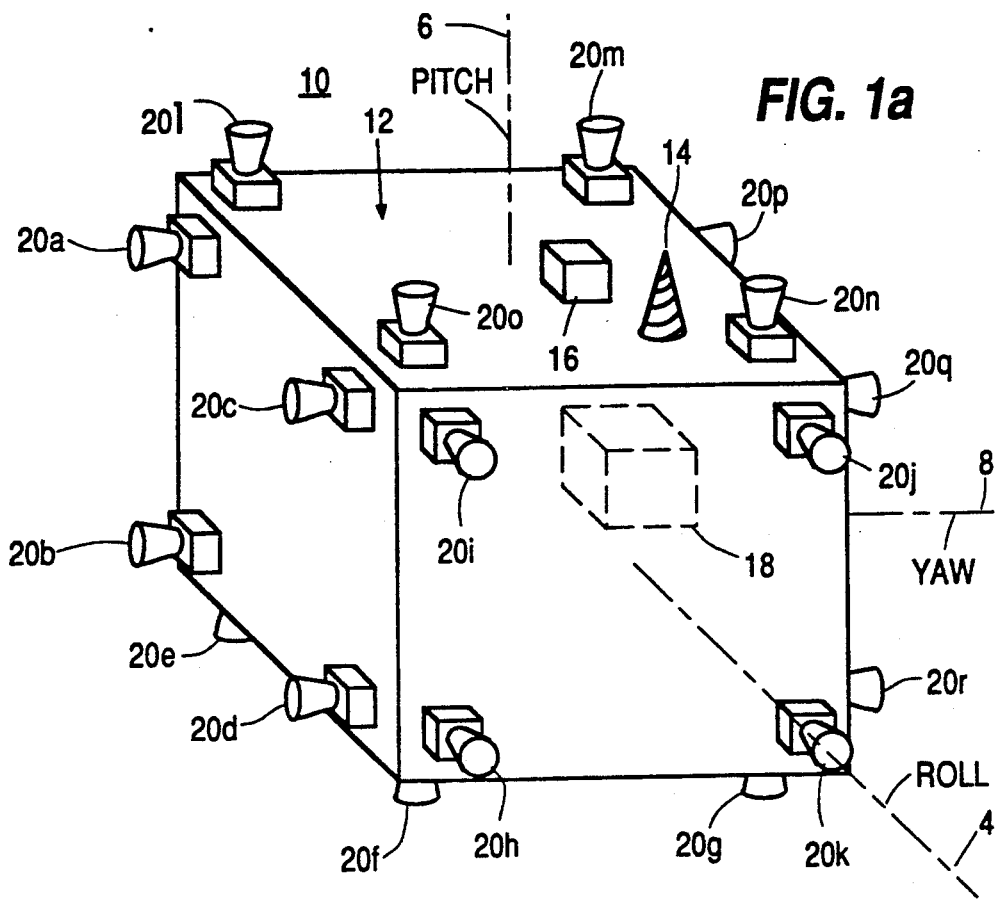
FIG. 1a is a perspective or isometric view of a spacecraft including a plurality of thrusters.

FIG. 1a illustrates a spacecraft which is controlled in accordance with the invention. In FIG. 1a, a spacecraft 10 having a body 12 includes a omnidirectional antenna illustrated as 14 which may be used for communication and command, and also includes attitude sensors for roll, pitch and yaw, which are illustrated together as a block 16. Roll, pitch and yaw axes 4, 6 and 8 are associated with spacecraft body 12. Attitude signals representative of roll, pitch and yaw are coupled (by means which are not illustrated) to a controller illustrated as a block 18 for generating thruster control signals. A plurality of thrusters illustrated as 20a-20r are associated with spacecraft body 12 and are connected (by means not illustrated) to controller 18 for being controlled thereby.

Figure 1B:
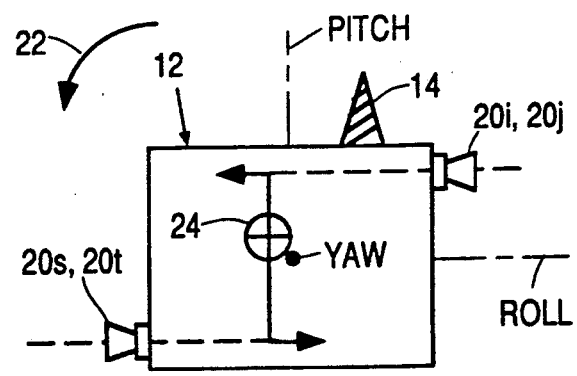

FIG. 1b illustrates spacecraft 10 in simplified form, looking along the yaw axis. Elements of FIG. 1b corresponding to those of FIG. 1a are designated by the same reference numerals. FIG. 1b is simplified, in that only thrusters 20i and 20j of FIG. 1a are illustrated, together with additional thrusters 20s, 20t which are not visible in FIG. 1a. Thrusters 20i, 20j, 20s and 20t when operated together are capable of generating a torque in the direction of arrow 22 about a center of gravity (CG) 24.

Figure 1C:
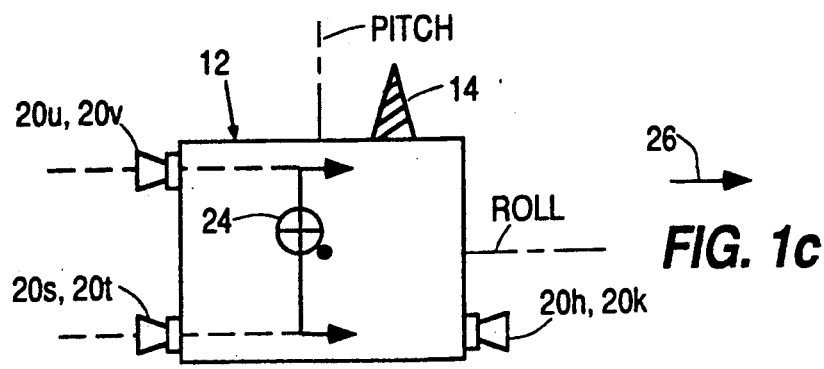

FIG. 1c is similar to FIG. 1b, and illustrates additional thrusters 20u, 20v which, together with thrusters 20s, 20t are capable of creating a force for accelerating the spacecraft in the direction of arrow 26. Since the center of gravity 24 is not equidistant between the projections of the direction of thrust of thrusters 20s, 20t, 20u and 20v, a torque will be created. Such a torque may be undesirable when only acceleration in a given direction is desired. Such a torque may be countered by operating thrusters 20h and 20k sufficiently to oppose the torque. Alternatively, translation may be accomplished without the torque by producing less thrust from thrusters 20s, 20t than from 20u, 20v.

The attitude of the spacecraft can be determined in any conventional manner. A method for determining the attitude of a spacecraft using a polar star sensor is described in U.S. Pat. application Ser. No. 07/511,169, filed Apr. 19, 1990 in the name of Paluszek. A method for determining the attitude of a spacecraft by the use of Doppler information measured from a ground station is described in U.S. Pat. application Ser. No. 07/397,939, filed Aug. 24, 1989 now U.S. Pat. No. 5,070,338 in the name of Cohen. Spacecraft velocity may also be determined in any conventional manner, such as by the use of radar either from the spacecraft or from a ground station. If a ground station determines the velocity or the attitude, the information may be transmitted to the spacecraft for reception by antenna 12 and for communication to controller 18. In general, attitude control requires that the spacecraft be torqued, and station keeping requires that forces be imported to the spacecraft. As mentioned in relation to FIGS. 1b and 1c, application of forces in turn may require application of torque to correct for residual torques imparted by the thrusters.

Figure 2:
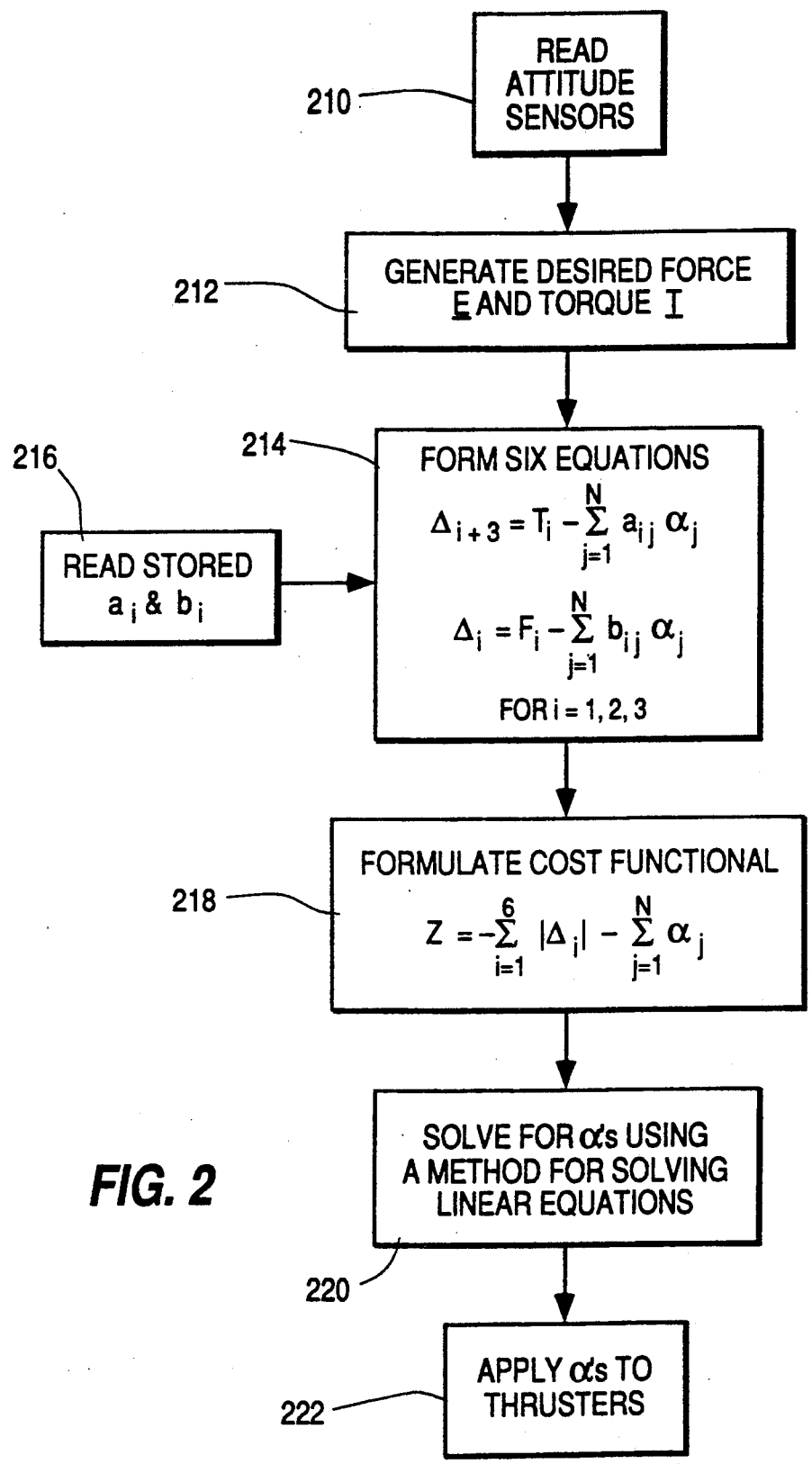
FIG. 2 is a flow chart illustrating a control method according to the invention.

Controller 18 of FIG. 1a responds to the attitude signals and, as appropriate, to the velocity signals in a conventional manner to produce command signals representing a force vector F and a torque vector T, which represent the force and torque vectors which are to be generated by the thrusters. The force vector F includes mutually orthogonal components $F_1$, $F_2$ and $F_3$. The torque vector T includes mutually orthogonal torque components $T_1$, $T_2$ and $T_3$. Naturally, depending upon the attitude error, some or most of the components may take on zero value for all or part of a maneuver. The method illustrated in FIG. 2 shows the reading of the attitude control signals as a block 210, and the generation of vectors F and T as a block 212.

In accordance with the invention, the control method includes the generation of six different equations $\Delta$:

$$\Delta_1 = F_1 - \sum_{j=1}^{N} b_1 \alpha_j \quad (1)$$

$$\Delta_2 = F_2 - \sum_{j=1}^{N} b_2 \alpha_j \quad (2)$$

$$\Delta_3 = F_3 - \sum_{j=1}^{N} b_3 \alpha_j \quad (3)$$

$$\Delta_4 = T_1 - \sum_{j=1}^{N} a_1 \alpha_j \quad (4)$$

$$\Delta_5 = T_2 - \sum_{j=1}^{N} a_2 \alpha_j \quad (5)$$

$$\Delta_6 = T_3 - \sum_{j=1}^{N} a_3 \alpha_j \quad (6)$$

In equations 1-6, $a_j$ is the maximum torque which the $j^{th}$ thruster can produce, and relates to the force which the $j^{th}$ thruster can produce and its distance from the center of gravity. There are a total of N thrusters. The term $b_j$ is the maximum force which the $j^{th}$ thruster can produce. The values of $a_j$ and $b_j$ are predetermined, and may be established by prelaunch measurements or by on-orbit tests performed from time to time. Variable $a_j$ represents the throttle setting of the $j^{th}$ thruster, which may take on values ranging from zero to unity. The step of forming equations 1-6 is illustrated in FIG. 2 as a block 214. The step represented by block 214 uses values $a_i$ and $b_i$ which are read from memory, as represented by block 216.

Block 218 of FIG. 2 illustrates a further step of the control method according to the invention, namely that of summing the difference equations 1-6 to produce a single scalar equation relating variable $\alpha$ to a scalar performance index Z.

$$Z = - \sum_{i=1}^{6} |\Delta_i| - \sum_{i=1}^{N} \alpha_i \quad (7)$$

Block 220 of FIG. 2 represents the solving of equation 7 for those values of $\alpha$ which maximize Z. The solution is achieved by some method for solving linear equations, such as a linear programming method. In particular, the Simplex method may be used. The Simplex method is described in standard texts, such as "Numerical Recipes," William H. Press et al., Cambridge University Press, 1986, pp. 289-293.

Finally, as illustrated by block 222 of FIG. 2, the values of $\alpha$ as determined in block 216 are applied for control of the corresponding thrusters to achieve the desired control result. This requires only a proportional throttling of the thrusters. If pulse-width modulation control is used, the ON to OFF durations are set to the required proportion for each thruster.

For North-South station keeping maneuvers for a geosynchronous satellite, to correct orbital inclination errors, translational forces in a North-South direction may be necessary. If the spacecraft is too far North, maximum $\Delta V$ in a Southerly direction may be necessary. In principle, this requires that the thrusters on the North face of the spacecraft be operated to provide thrust along the pitch axis. However, differences in thrust among the North-face thrusters, attitude errors and the like may result in net thrust in undesired directions. Prior to starting the maneuver, attitude-sensing gyros are initialized by the use of Earth sensor data. Attitude errors sensed by the gyros during the maneuver are applied to the control arrangement, corresponding to block 212 of FIG. 2. The control arrangement may use a proportional-derivative algorithm, or a proportional-integral-derivative (PID) algorithm. A PID controller is described in U.S. Pat. application Ser. No. 07/459,627, filed Jan. 2, 1990 now U.S. Pat. No. 5,025,381 in the name of Goodzeit et al. The controller calculates control torques T about pitch, roll and yaw axes which are required for stabilizing the spacecraft. Torques T are used in block 214 to generate $\Delta_4$, $\Delta_5$ and $\Delta_6$. For this particular application, the cost functional Z produced in block 218 of FIG. 1 has the form:

$$Z = - \sum_{i=4}^{6} |\Delta_i| + \sum_{j=p}^{N_2} \alpha_j - \sum_{j=1}^{N} \alpha_j \quad (8)$$

which is generated by substituting $$\sum_{j=p}^{N_2} \alpha_j \text{ for } \sum_{i=1}^{3} |\Delta_i|$$

in equation 6.

In equation 7, thrusters with indices ranging from p to $N_2$ are oriented for thrust in the direction opposite to the desired $\Delta V$ direction. The values of $\alpha$ are applied to the corresponding thrusters, so that attitude control about roll and yaw axes is accomplished by throttling or modulating the North-face thrusters. Attitude control about the pitch axis (the $\Delta V$ axis) is exerted by pulsing ON the East and West face thrusters.

Thus, maximizing the cost functional Z will maximize $\Delta V$, and will minimize errors between the desired control torques and the actual control torques. The cost functional equation (equation 6 or 7) is solved during each control cycle using linear programming method to maximize Z, and the throttle settings $\alpha_j$ always remain in the range of 0 to 1. The throttle values $\alpha_j$ are used to set the pulse width (or other throttle control) for each thruster, so that the pulse width equals $\tau\alpha_j$, where $\tau$ is the control period.

The method according to the invention has a further advantage, in that the control algorithm which generates the desired F and T can be common among a plurality of spacecraft, thereby achieving a cost reduction and an increase in effective reliability. Since only the thruster characteristics and their number and location relative to the center of gravity change from spacecraft to spacecraft, only the values of $a_{ij}$ and $b_{ij}$ need be changed in the equations represented by block 216 of FIG. 2, and the control logic may be reused but for these minor changes.

Other embodiments of the invention will be apparent to those skilled in the art. In particular, this approach could be used with other actuators such as magnetic torquers and reaction wheels. It could be used with combinations of momentum exchange devices and low thrust thrusters. It could be used solely as part of a momentum unloading system in which momentum exchange devices were used for control. In addition, predefined weighting factors could be added to increase or decrease the significance of a term in the cost equation.

What is claimed is:

1. A method for controlling the attitude and velocity of a spacecraft, comprising the steps of:
generating sensed signals representative of pitch, roll, yaw and at least velocity error of said spacecraft;
from said sensed signals, generating command signals representing a force vector F, and torque vector T to be generated by said thrusters, said force vector F including mutually orthogonal components $F_1$, $F_2$ and $F_3$, and said torque vector T including mutually orthogonal components $T_1$, $T_2$ and $T_3$, some or all of which said $F_1$, $F_2$, $F_3$ and $T_1$, $T_3$ and $T_3$ can from time to time take on zero magnitude;
generating difference signals representing six difference equations $\Delta$ of the form:

$$\Delta_1 = F_1 - \sum_{j=1}^{N} b_{1j}\alpha_j$$

$$\Delta_2 = F_2 - \sum_{j=1}^{N} b_{2j}\alpha_j$$

$$\Delta_3 = F_3 - \sum_{j=1}^{N} b_{3j}\alpha_j$$

$$\Delta_4 = T_1 - \sum_{j=1}^{N} a_{1j}\alpha_j$$

$$\Delta_5 = T_2 - \sum_{j=1}^{N} a_{2j}\alpha_j$$

-continued $$\Delta_6 = T_3 - \sum_{j=1}^{N} a_{3j}\alpha_j$$

where:
N is the total number of thrusters;
$a_{1j}$, $a_{2j}$ and $a_{3j}$ are the maximum torques which the $j^{th}$ thrusters can produce about the 1st, 2nd and 3nd axes;
$b_{1j}$ $b_{2j}$ $b_{3j}$ are the maximum forces which the $j^{th}$ thrusters can produce along the 1st, 2nd and 3rd axes; and
$\alpha_j$ is a variable representing the throttle setting of the $j^{th}$ thruster, which can take on volumes ranging from zero to unity;
summing said difference signals to form a single scalar equation relating the variable $\alpha_j$ to a scalar performance index Z;
solving said scalar equation for a value of the variable $\alpha_j$ which maximizes said Z; and
controlling each thruster in a manner directly related to the corresponding value of said $\alpha_j$.

2. A method according to claim 1 wherein said solving step comprises the step of applying a linear programming method algorithm for solving said scalar equation.

3. A method according to claim 2 wherein said linear programming method algorithm comprises a Simplex algorithm.

4. A method according to claim 1, wherein said summing step forms a single scalar equation in which the equation defining said scalar Z includes at least the term $$-\sum_{i=m}^{6} |\Delta_i| + \sum_{j=p}^{N_2} \alpha_j$$

where thrusters which indices ranging from P to $N_2$ are oriented for thrust in the direction opposite to the desired $\Delta V$ direction, and m=1.

5. A method according to claim 4, wherein p=1 and $N_2$ equals the total number of thrusters.

6. A method according to claim 4, wherein said equation defining said scalar Z includes, in addition to the term $$-\sum_{i=m}^{6} |\Delta_i| + \sum_{j=p}^{N_2} \alpha_j$$

the additional term $$-\sum_{j=1}^{N_1} \alpha_j$$

where $p=N_1$, and thrusters having indices ranging from 1 to $N_1$ do not have their thrust vectors aligned with a desired direction of acceleration, while thrusters having indices ranging from $N_1$ to $N_2$ have their thrust vectors aligned with the desired direction of acceleration.

* * * * *